United States Patent
Brown

(10) Patent No.: US 11,248,975 B2
(45) Date of Patent: Feb. 15, 2022

(54) HIGH DYNAMIC RANGE CAPACITIVE PRESSURE SENSOR

(71) Applicant: Fluke Corporation, Everett, WA (US)

(72) Inventor: Timothy Byron Brown, Everett, WA (US)

(73) Assignee: Fluke Corporation, Everett, WA (US)

( * ) Notice: Subject to any disclaimer, the term of this patent is extended or adjusted under 35 U.S.C. 154(b) by 88 days.

(21) Appl. No.: 16/821,898

(22) Filed: Mar. 17, 2020

(65) Prior Publication Data

US 2020/0217734 A1    Jul. 9, 2020

Related U.S. Application Data

(62) Division of application No. 15/687,339, filed on Aug. 25, 2017, now Pat. No. 10,612,991.

(51) Int. Cl.
*G01L 7/08* (2006.01)
*G01L 9/12* (2006.01)
*G01L 9/00* (2006.01)

(52) U.S. Cl.
CPC ................... *G01L 9/0072* (2013.01)

(58) Field of Classification Search
CPC ..... G01L 7/00; G01L 7/08; G01L 9/00; G01L 9/0072; G01L 9/12
See application file for complete search history.

(56) References Cited

U.S. PATENT DOCUMENTS

| 5,024,100 A | 6/1991 | Weinstein |
| 5,844,769 A | 12/1998 | Maier |

(Continued)

FOREIGN PATENT DOCUMENTS

| EP | 1898196 A2 | 3/2008 | |
| EP | 2207020 B1 * | 2/2018 | ........... G01L 9/0073 |

(Continued)

OTHER PUBLICATIONS

Vallin, O., et al., "Direct Bonded Quartz Resonators," *Proceedings of the IEEE International Frequency Control Symposium and PDA Exhibition* (Cat. No.01CH37218), 2001, pp. 345-348.

(Continued)

*Primary Examiner* — Nguyen Q. Ha
(74) *Attorney, Agent, or Firm* — Seed IP Law Group LLP

(57) ABSTRACT

A method for expanding the dynamic range of a capacitive pressure sensor and a capacitive pressure sensor having an expanded dynamic range are provided. The capacitive pressure sensor may comprise capacitive plates. At least one plate may be contoured to increase a surface area exposed to the other of the capacitive plates. The capacitive pressure sensor may comprise a diaphragm that is movably responsive to pressure. The diaphragm may have a hollowed volume within an interior of the diaphragm operative to increase a flexibility of the diaphragm in response to the pressure. The capacitive pressure sensor may be one of a plurality of capacitive pressure sensors in a pressure sensing device. The capacitive pressure sensors may have different capacitive responses and may each output a pressure measurement, whereby the device may select a pressure measurement to output based at least in part on the capacitive responses.

9 Claims, 6 Drawing Sheets

(56) References Cited

U.S. PATENT DOCUMENTS

| | | | |
|---|---|---|---|
| 6,532,824 B1 | 3/2003 | Ueno et al. | |
| 7,526,961 B2 | 5/2009 | Downie et al. | |
| 7,900,518 B2 * | 3/2011 | Tai | G01L 9/0072 73/754 |
| 9,464,950 B2 | 10/2016 | Zhang et al. | |
| 10,183,859 B2 | 1/2019 | Kosberg et al. | |
| 2007/0277616 A1 | 12/2007 | Nikkei et al. | |
| 2008/0270046 A1 | 10/2008 | Borenstein | |
| 2011/0283803 A1 | 11/2011 | Kurtz et al. | |
| 2013/0234263 A1 | 9/2013 | Ikehashi | |
| 2014/0208859 A1 | 7/2014 | Miyashita | |
| 2014/0301017 A1 | 10/2014 | Diehl et al. | |
| 2016/0161353 A1 | 6/2016 | Kurtz et al. | |
| 2016/0324443 A1 | 11/2016 | Rowland et al. | |
| 2016/0349129 A1 | 12/2016 | Pagani et al. | |
| 2017/0241855 A1 | 8/2017 | Sooriakumar et al. | |
| 2018/0052066 A1 | 2/2018 | Pagani et al. | |
| 2019/0242771 A1 | 8/2019 | Hamazaki | |

FOREIGN PATENT DOCUMENTS

| | | | | |
|---|---|---|---|---|
| JP | 2007071770 A | * | 3/2007 | G01L 9/12 |
| JP | 2008309752 A | | 12/2008 | |
| WO | WO-2007086489 A1 | * | 8/2007 | G01L 9/0073 |
| WO | 2016156162 A1 | | 10/2016 | |

OTHER PUBLICATIONS

Selby, M. C., "Conical Coaxial Capacitors and Their Advantages", *Journal of Research of the National Bureau of Standards—C. Engineering and Instrumentation,* vol. 63C, No. 2, Jun. 16, 1959, pp. 87-89.

\* cited by examiner

HIGH DYNAMIC RANGE CAPACITIVE PRESSURE SENSOR

BACKGROUND

Technical Field

This application is directed to a capacitive pressure sensor, and in particular, a capacitive pressure sensor having an expanded dynamic range.

Description of the Related Art

Capacitive pressure sensors rely on a variation in capacitance to detect a condition, such as a gas or fluid pressure. The accuracy of a capacitive sensor over various pressure ranges is constrained by the dynamic range of the sensor. The capacitive responsiveness of a capacitive pressure sensor deteriorates outside certain pressure ranges. Consequently, the sensor may be deemed unreliable beyond the pressure ranges. Whereas the capacitive sensor may be accurate when used to measure a pressure value within its dynamic range, it becomes less reliable for measuring another pressure value outside of the dynamic range. Widening or increasing the dynamic range of capacitive pressure sensors is, therefore, desirable as it results in reliable pressure measurements over a wider pressure range.

BRIEF SUMMARY

In an embodiment, a capacitive pressure sensor includes a first capacitive plate having a first side and a second side and a second capacitive plate having a first side and a second side, where the second side of the second capacitive plate is separated from the first side of the first capacitive plate by a dielectric between the first and second capacitive plates. In an embodiment, a capacitive pressure sensor includes a diaphragm adjacent to the second side of the first capacitive plate, where the diaphragm includes a volume of material having a base adjacent to the second side of the first capacitive plate. In an embodiment, the diaphragm is movably responsive to pressure such that an increase in the pressure causes the diaphragm to flex toward the first capacitive plate, causing a distance between the first and second capacitive plates to shorten and thereby increasing a capacitance between the first and second capacitive plates. In an embodiment, the diaphragm has a hollowed volume within an interior of the diaphragm operative to increase a flexibility of the diaphragm in response to the pressure.

In an embodiment, a capacitive pressure sensor includes a base plate adjacent to the first side of the second capacitive plate. In an embodiment, a capacitive pressure sensor includes vertical interconnect access channels extending through the base plate and terminating at the second capacitive plate providing access to the second capacitive plate for reading the capacitance of the capacitive pressure sensor. In an embodiment, a capacitive pressure sensor includes a bonding layer disposed at a periphery of the diaphragm and the base plate for bonding the diaphragm to the base plate.

In an embodiment, the hollowed volume extends longitudinally at least partially through the diaphragm between the periphery of the diaphragm and a necked region that is disposed in the base of the diaphragm. In an embodiment, the necked region has a central axis transverse to the base of the diaphragm and the necked region is not hollowed. In an embodiment, the bonding layer includes quartz bonding. In an embodiment, at least one of the first side of the first capacitive plate and the second side of the second capacitive plate is contoured to increase a surface area of the at least one of the first side of the first capacitive plate and the second side of the second capacitive plate that is exposed to the other of the first side of the first capacitive plate and the second side of the second capacitive plate.

In an embodiment, the hollowed volume comprises globules of vacuum or air dispersed within the interior of the diaphragm. In an embodiment, at least one of the first capacitive plate and the second capacitive plate is metalized with hafnium or hafnium oxide. In an embodiment, at least one of the first capacitive plate and the second capacitive plate includes tantalum and is metalized with a tantalum oxide coating thereon. In an embodiment, at least one of the first capacitive plate and the second capacitive plate is metalized to amplify the capacitance between the first and second capacitive plates. In an embodiment, the diaphragm is a fused silica wafer with the first capacitive plate deposited thereon.

In an embodiment, a capacitive pressure sensor includes a first capacitive plate having a first side and a second side and a second capacitive plate having a first side and a second side, where the second side of the second capacitive plate is separated from the first side of the first capacitive plate by a dielectric disposed between the first and second capacitive plates. In an embodiment, a capacitive pressure sensor includes a diaphragm adjacent to the second side of the first capacitive plate, where the diaphragm is movably responsive to pressure on the diaphragm and operative to flex toward the first capacitive plate and cause a distance between the diaphragm and the first capacitive plate to shorten, thereby increasing a capacitance between the first and second capacitive plates. In an embodiment, at least one of the first side of the first capacitive plate and the second side of the second capacitive plate is contoured to increase a surface area of the at least one of the first side of the first capacitive plate and the second side of the second capacitive plate that is exposed to the other of the first side of the first capacitive plate and the second side of the second capacitive plate.

In an embodiment, the at least one of the first capacitive plate and the second capacitive plate is contoured in the shape of a cone, an inverted cone, a curved cone, or an inverted curved cone. In an embodiment, the at least one of the first side of the first capacitive plate and the second side of the second capacitive plate is contoured such that the increased surface area is operative to widen the capacitive response of the capacitive pressure sensor for measurement of pressure over a wider range of pressures. In an embodiment, the first side of the first capacitive plate is contoured with a first shape and the second side of the second capacitive plate is contoured with a second shape that is an inversion of the first shape. In an embodiment, the second shape is not an inversion of the first shape. For example, the second shape may be different than the first shape and the inversion thereof.

In an embodiment, a pressure sensing device includes a first capacitive pressure sensor that is exposed to an external environmental pressure, where the first capacitive pressure sensor has a first capacitive response having a first dynamic range over a first pressure range. In an embodiment, the first capacitive pressure sensor is configured to sense a first pressure being exerted upon the first capacitive pressure sensor, and output, based on the sensed first pressure, a first signal representative of a first pressure measurement of the first capacitive pressure sensor. In an embodiment, a pressure sensing device includes a second capacitive pressure sensor that is exposed to the external environmental pressure, where the second capacitive pressure sensor has a second capacitive response different than the first capacitive response and the second capacitive response having a second dynamic range over a second pressure range that is different than the first pressure range. In an embodiment, a pressure sensing device includes more than two capacitive pressure sensors.

In an embodiment, the second capacitive pressure sensor is configured to sense a second pressure being exerted upon the second capacitive pressure sensor and output, based on the sensed second pressure, a second signal representative of a second pressure measurement of the second capacitive pressure sensor. In an embodiment, a pressure sensing device includes control circuitry configured to receive the first and second signals from the first and second capacitive pressure sensors, determine, based on the first and second signals and the first and second pressure ranges, whether to output the first or second pressure measurement as a measurement of the environmental pressure, and in response to the determination, output the measurement of the environmental pressure.

In an embodiment, determining whether to output the first or second pressure measurement includes identifying the first and second pressure measurements based on the first and second signals, respectively, and identifying one of the first pressure range and the second pressure range that includes at least one of the first pressure measurement, the second pressure measurement, or a pressure value that is a function of the first and second pressure measurements. In an embodiment, determining whether to output the first or second pressure measurement includes outputting the first pressure measurement as the measurement of the environmental pressure if the first pressure range includes the at least one of the first pressure measurement, the second pressure measurement, or the pressure value, or outputting the second pressure measurement if the second pressure range includes the at least one of the first pressure measurement, the second pressure measurement, or the pressure value.

In an embodiment, determining whether to output the first or second pressure measurement includes selecting one of the first pressure measurement, the second pressure measurement, or a pressure value that is a function of the first and second pressure measurements, if the selected one of the first pressure measurement, the second pressure measurement, or the pressure value is less than a threshold pressure, outputting the first pressure measurement, and if the selected one of the first pressure measurement, the second pressure measurement, or the pressure value is greater than the threshold pressure, outputting the second pressure measurement.

In an embodiment, a pressure sensing device includes an interdigital capacitor including a first conductor having a first side and a second side, where the first conductor has a first plurality of fingers extending longitudinally from the first side of the first conductor. In an embodiment, the interdigital capacitor includes a second conductor having a first side and a second side, where the second conductor has a second plurality of fingers extending longitudinally from the second side of the second conductor. In an embodiment, the second plurality of fingers is interleaved with the first plurality of fingers with a dielectric therebetween.

In an embodiment, a pressure sensing device includes a diaphragm adjacent to the second side of the first conductor, where the diaphragm is movably responsive to pressure such that an increase in the pressure causes the diaphragm to flex onto the first conductor, causing a distance between the first and second conductors to shorten and thereby increase a capacitance between the first and second conductors.

DETAILED DESCRIPTION

Figure 1:
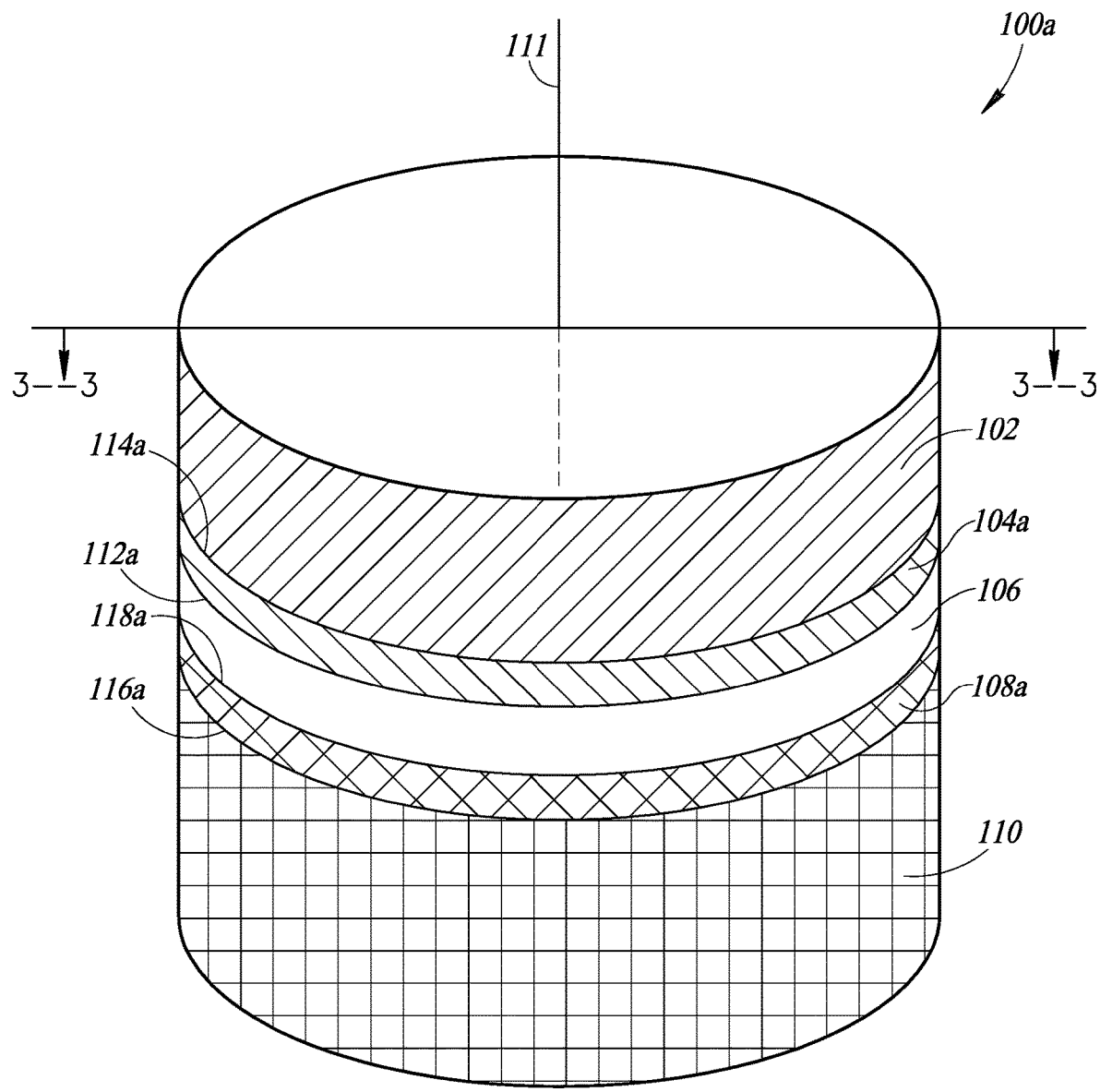
FIG. 1 shows a perspective view of a capacitive pressure sensor in accordance with an embodiment.

FIG. 1 shows a perspective view of a capacitive pressure sensor 100a in accordance with an embodiment of the present disclosure. The capacitive pressure sensor 100a includes a diaphragm 102, a first capacitive plate 104a, a dielectric 106, a second capacitive plate 108a, and a base 110. The first capacitive plate 104a has a first side 112a and a second side 114a. The second capacitive plate 108a has a first side 116a and a second side 118a. The diaphragm 102 may be made of any material that flexes in response to pressure. The diaphragm 102 may, for example, be an alumina or a silicon diaphragm. The diaphragm 102 is adjacent to the second side 114a of the first capacitive plate 104a.

The dielectric 106 may be any material that has a low permittivity. Further, the dielectric 106 may be any material that is electrically nonconductive. For example, the dielectric 106 may be vacuum or air. The dielectric 106 is disposed between the first side 112a of the first capacitive plate 104a and the second side 118a of the second capacitive plate 108a.

The base 110 is adjacent to the first side 116a of the second capacitive plate 108a. The base 110 may be made of a material that is rigid and does not easily flex with pressure. Alternatively, the base 110 may be made of a flexible material like the diaphragm 102.

Although not shown in FIG. 1 to facilitate description, the diaphragm 102 and the base 110 may be bonded at the periphery of the diaphragm 102 and the base 110. The bonding may be in an area to which the first and second capacitive plates 104a, 108a do not extend. Thus, the diaphragm 102 and the base 110 may be bound together to enclose the dielectric 106 between the plates 104a, 108a and integrate the capacitive pressure sensor 100a as one unit.

The capacitive pressure sensor 100a (or the diaphragm 102 thereof) may be exposed to an environment and may be used for sensing the pressure of the environment. The capacitive pressure sensor 100a may, for example, sense pneumatic pressure, atmospheric pressure, or fluid pressure, and may further sense changes in such pressure.

When pressure (e.g., in the environment) is applied to the capacitive pressure sensor 100a, the diaphragm 102 flexes away from a point or a region where the pressure is applied. For example, when pressure is applied to the outer surface of the diaphragm 102, the diaphragm flexes toward the first capacitive plate 104a and pushes the first capacitive plate 104a closer to the second capacitive plate 108a, causing the distance between the capacitive plates 104a, 108a to shorten. The capacitance of the capacitive plates 104a, 108a is inversely proportional to the distance between the capacitive plates 104a, 108a. Thus, the application of pressure to the capacitive pressure sensor 100a causes the capacitance to increase. Conversely, the reduction or removal of pressure relaxes or straightens the diaphragm 102 thereby causing the distance between the plates 104a, 108a to increase and the capacitance to decrease.

Conventional flat plate capacitive pressure sensors have a limited dynamic capacitive response and are not able to reliably respond to pressure for wide pressure ranges of interest. The lack of a wide dynamic response (or in some instances a wide range of linearity) limits the accuracy of the sensors. For example, the accuracy deteriorates for pressures in relatively higher ranges. As described herein, the capacitive response of a capacitive pressure sensor is dynamic when a pressure reading or indicating device, such as, a gauge or an indicator, can detect and use the change of capacitance in the sensor to accurately convey (for example, within an established margin for error) the pressure being exerted on the sensor. The dynamic capacitive response of a conventional capacitive pressure sensor is thus limited when the capacitive response of the sensor becomes saturated or plateaus.

Figure 2:
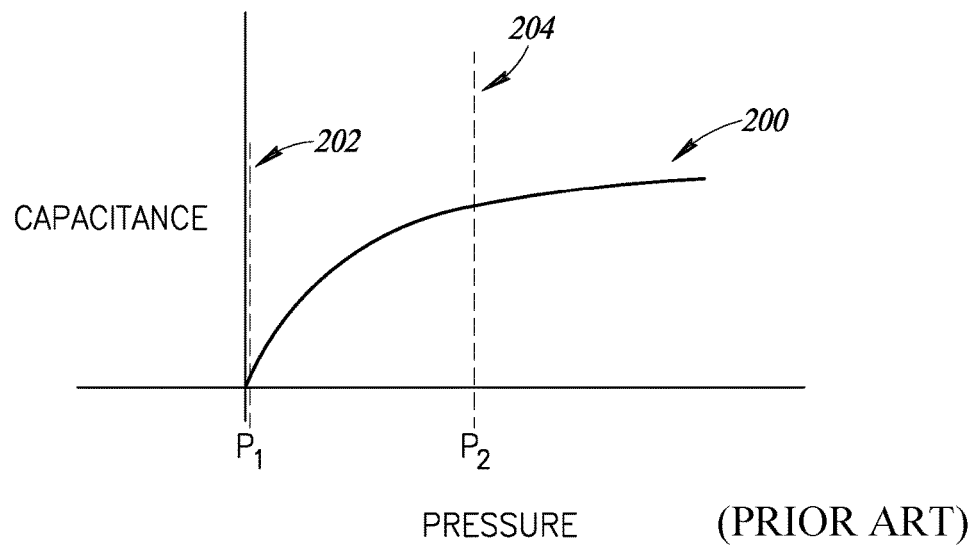
FIG. 2 shows an exemplary capacitive response of a conventional capacitive pressure sensor.

FIG. 2 shows an exemplary capacitive response 200 of a conventional capacitive pressure sensor. The capacitive response 200 shows the capacitance of the conventional capacitive pressure sensor in relation to applied pressure. For pressures that are lower than a first pressure point 202 ($P_1$), the capacitive response 200 is not sufficiently dynamic and changes in pressure are not reflected by adequate or significant enough changes in capacitance. Between the first pressure point 202 and a second pressure point 204 ($P_2$), the capacitive response 200 is dynamic. The dynamic range of the capacitive response 200 may be said to be between the first and second pressure points 202, 204. After the second pressure point 204, the capacitive response 200 becomes saturated and plateaus.

The dynamic range of the pressure sensing device 100a may be widened by improving the flexibility of the diaphragm 102. As the movement of the diaphragm 102 increases in relation to pressure in pressure ranges outside the conventional dynamic range, the capacitive response of the pressure sensing device 100a improves.

Figure 3:
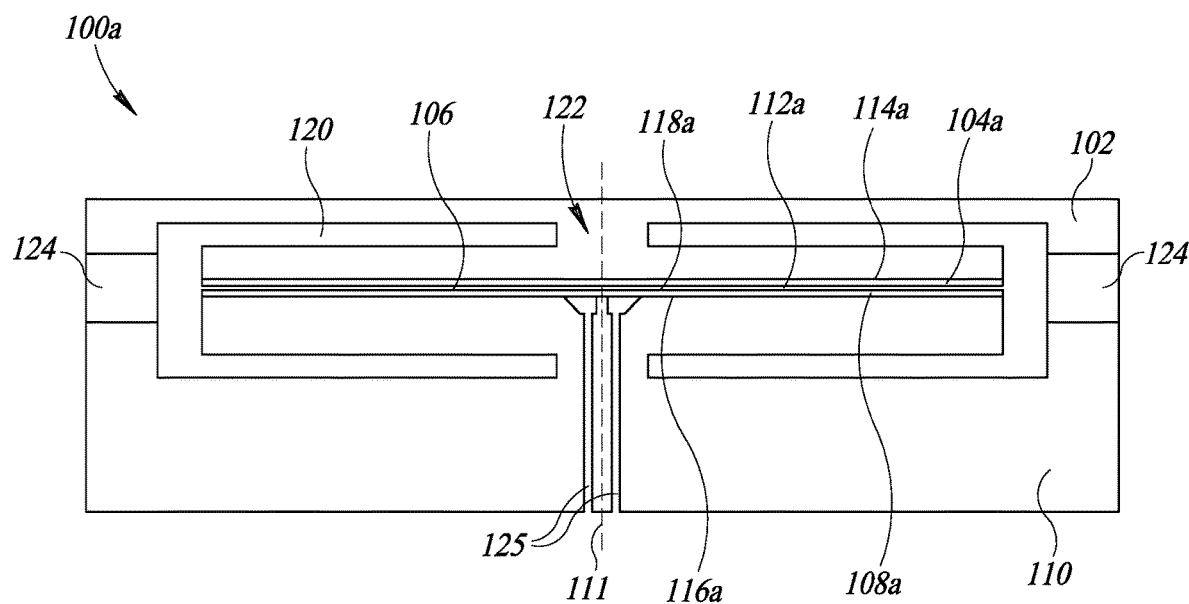
FIG. 3 shows a cross-sectional view of the pressure sensing device taken through line 3-3 in FIG. 1.

FIG. 3 shows a cross-sectional view of the pressure sensing device 100a taken through line 3-3. The diaphragm 102 has a hollowed volume 120 within the diaphragm's interior. Because one side of the diaphragm 102 is adjacent to the first capacitive plate 104a, a rigidity of the capacitive plate makes the diaphragm 102 more rigid. By hollowing the diaphragm 102 with the volume 120, the diaphragm becomes more flexible in relation to pressure. The volume 120 may be a void, vacuum, or air or other gas.

The first side 116a of the second capacitive plate 108a may be electrically connected (e.g., soldered) to vertical interconnect access (VIAs) 125. The VIAs 125 provide access to the second capacitive plate 108a for determining (or reading) the capacitance of capacitive pressure sensor 100a. Based on the capacitance, a pressure measurement may be determined.

In FIG. 3, the diaphragm 102 and the base 110 are bonded together in a bonding region 124. The bonding region 124, which may be disposed at a periphery of the diaphragm 102 and the base 110, also increases the rigidity of the diaphragm 102. Particularly, the bonding region 124 increases the rigidity around the periphery of the diaphragm 102. The rigidity decreases radially inward proportional to the distance from the bonding region 124. The diaphragm 102 is more flexible near a central axis 111 of the diaphragm 102 than at the periphery.

As shown in FIG. 3, the hollowed volume 120 extends longitudinally through the diaphragm 102, parallel to a base of the diaphragm 102, whereby at least a portion of the base of the diaphragm 102 is adjacent the first capacitive plate 104a. A necked region 122 of the diaphragm 102 is not hollowed. The necked region 122 is shown as being disposed about the central axis 111 of the diaphragm 102 (e.g., in a geometric center of the base of the diaphragm 102), wherein the central axis of the necked region 122 is transverse to the base and the longitudinal axis of the hollowed volume 120.

The hollowed volume 120 makes the diaphragm 102 more movably responsive to pressure in regions where the diaphragm 102 is more rigid. Because the center of the diaphragm 102 is more responsive to pressure than the periphery, the necked region 122 may not be hollowed. The hollowed volume 120 also allows for increasing the thickness of the diaphragm 102 without sacrificing the flexibility of the diaphragm. The diaphragm 102 may be thickened while at the same time a volume of an interior of the diaphragm is hollowed. The increased flexibility gained by hollowing the diaphragm may counteract the flexibility that would otherwise be lost (or the rigidity that would otherwise be gained) by increasing the thickness of the diaphragm. Additionally, increasing the thickness of the diaphragm 102 further isolates the first capacitive plate 104a from the environment outside of the diaphragm. This isolation protects the first capacitive plate 104a as well as other elements of the capacitive pressure sensor 100a from environmental conditions, such as moisture, in the outside environment. Consequently, environmental wear experienced by the first capacitive plate 104a is reduced and the shelf life of the first capacitive plate 104a and the capacitive pressure sensor 100a overall is increased.

Quartz bonding may be used to develop the bonding region 124 that bonds the diaphragm 102 and the base 110. The diaphragm 102 and the base 110 may be polished fused silica wafers. Quartz may be developed on the diaphragm 102 and the base 110 by destroying the polished fused silica at a periphery of the diaphragm 102 and the base 110 using laser and then etching the polished fused silica wafers rapidly. Quartz bonding may include thermal fusing and direct wafer that are known to those skilled in the art. Then, tantalum or tantalum oxide may be sputtered (or deposited) on the fused silica wafers of the diaphragm 102 and the base 110 to form the first and second capacitive plates 104a, 108a, respectively. The wafers are then bonded to form the pressure sensing device 100a.

It is noted that the hollowed volume 120 may be of any shape. For example, the hollowed volume 120 of the diaphragm 102 may include spheres (e.g., vacuum or air globules) dispersed within the interior of the diaphragm 102.

Further, the hollowed volume 120 may include strips that extend longitudinally transverse or parallel to the central axis 111.

Figure 4:
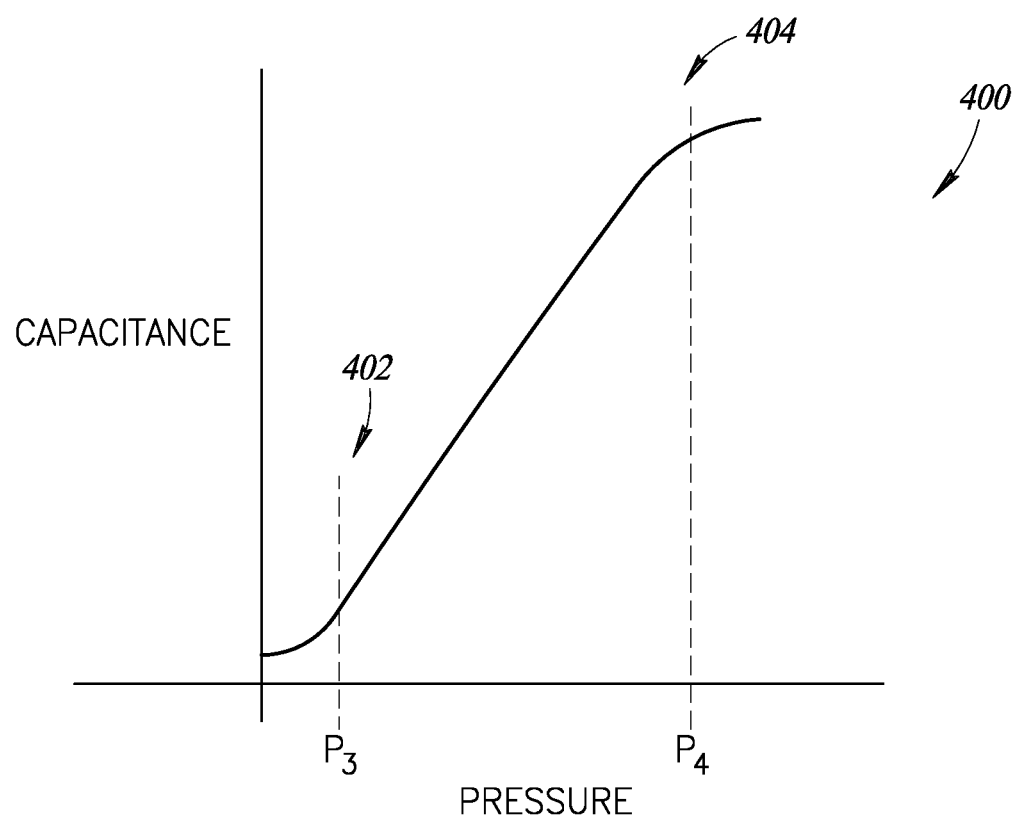
FIG. 4 shows an exemplary capacitive response of the capacitive pressure sensor of FIG. 1.

FIG. 4 shows an exemplary capacitive response 400 of a capacitive pressure sensor having the capacitive plates 104*b*, 108*b* described with reference to FIGS. 5A-5D. The capacitive response 400 has a dynamic range between a first pressure point 402 ($P_3$) and a second first pressure point 404 ($P_4$). The dynamic range of the capacitive pressure sensor 100*a* is wider than the dynamic range of the conventional pressure sensor described with reference to FIG. 2 herein. The dynamic range of the capacitive pressure sensor 100*a* spans a wider range of pressures. The wider dynamic range may be the result of contouring the plates of the capacitive pressure sensor as described with reference to FIGS. 5A-5D. The wider dynamic range may also be the result of the improved flexibility of the diaphragm 102 and the improved pressure response of the capacitive pressure sensor 100*a*.

Changing the geometry of the capacitive plates or modifying the shape of the capacitive plates may cause the average distance between points on the plates to change differently than the distance between the planes of the plates. This allows for tailoring the capacitive response to pressure and changing the shape of the capacitive response (for example, to become more linear). The shapes or features of the plates may be modified in various ways to change the capacitive response.

Referring back to FIG. 2, conventional capacitive pressure sensors experience saturation for pressures above the second pressure point 204. In the saturation region, changes in pressure do not result in as significant of a change in capacitance compared with changes in pressure in the dynamic range. As described herein, the limited responsiveness of conventional capacitive pressure sensors outside their dynamic range reduces the accuracy of the sensors, e.g., in the saturation region. The saturation is due at least in part to the fact that as the pressure increases beyond the second pressure point 204, the diaphragm (having already been flexed) becomes more resistive to flexing in response to increased pressure. As a result, the gap between the plates of the sensor is only marginally changed due to the further application of pressure. Consequently, for a given increased amount of pressure exerted on the conventional pressure sensor in the saturation region, only a marginal change in capacitance of the pressure sensor is observed.

FIGS. 5A-5D show first and second capacitive plates 104*b*, 108*b* of a capacitive pressure sensor 100*b* in accordance with various embodiments of the present disclosure. The first capacitive plate 104*b* has a first side 112*b* and a second side 114*b*, and the second capacitive plate 108*b* has a first side 116*b* and a second side 118*b*. The first side 112*b* of the first capacitive plate 104*b* and the second side 118*b* of the second capacitive plate 108*b* have a dielectric positioned therebetween.

The first side 112*b* of the first capacitive plate 104*b* and the second side 118*b* of the second capacitive plate 108*b* are contoured with microstructures. In the example shown in FIG. 5A, the first capacitive plate 104*b* is contoured to have a cone 132 microstructure, and the second capacitive plate 108*b* is contoured to have an inverted cone 134 microstructure. In the example shown in FIG. 5B, the first capacitive plate 104*b* is contoured to have a curved cone 136, and the second capacitive plate 108*b* is contoured to have an inverted curved cone 138. In the example shown in FIG. 5C, the first and second capacitive plates 104*b*, 108*b* are contoured to both have a curved cone 140, 142 microstructure, respectively. In the example shown in FIG. 5D, the second capacitive plate 108*b* is contoured with various microstructures 144 thereon while the first capacitive plate 104*b* remains planar.

Contouring the first and second capacitive plates 104*b*, 108*b* may include configuring one plate (e.g., the first capacitive plate 104*b*) with a microstructure and configuring the other plate (e.g., the second capacitive plate 108*b*) with an inverse of the microstructure. In other embodiments, either or both plates 104*b*, 108*b* may be configured with the same microstructure or different-shaped microstructures. A plate 104*b*, 108*b* may also be configured with an inverse of the microstructure of the other plate 104*b*, 108*b*.

Contouring the first and second capacitive plates 104*b*, 108*b* exposes more surface area of the capacitive plates 104*b*, 108*b* to each other as compared with the use of flat capacitive plates 104*b*, 108*b*. Particularly, contouring the capacitive plates 104*b*, 108*b* as shown amplifies the capacitive response in the saturation region described above.

Figure 5A:
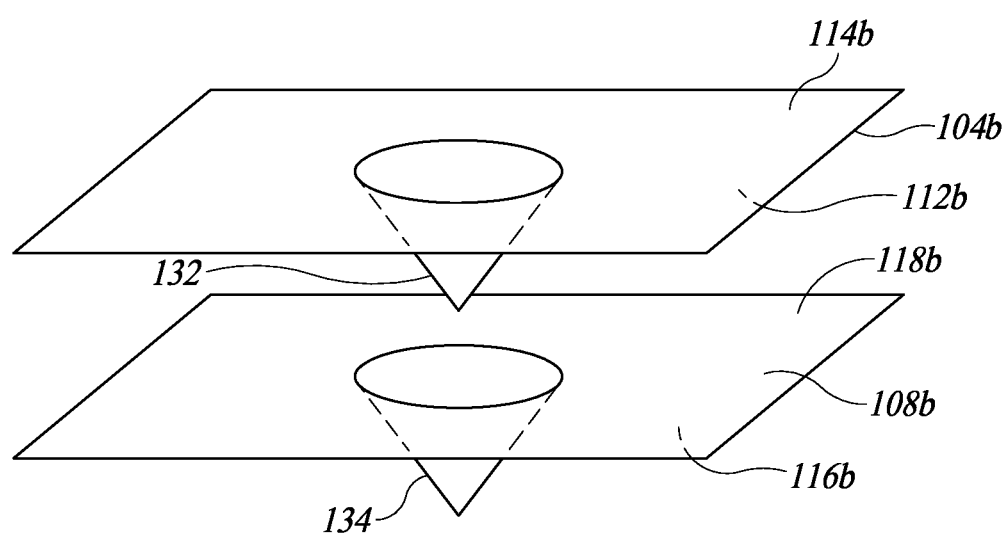
FIGS. 5A-5D show first and second capacitive plates of a capacitive pressure sensor in accordance with an embodiment.
Figure 5B:
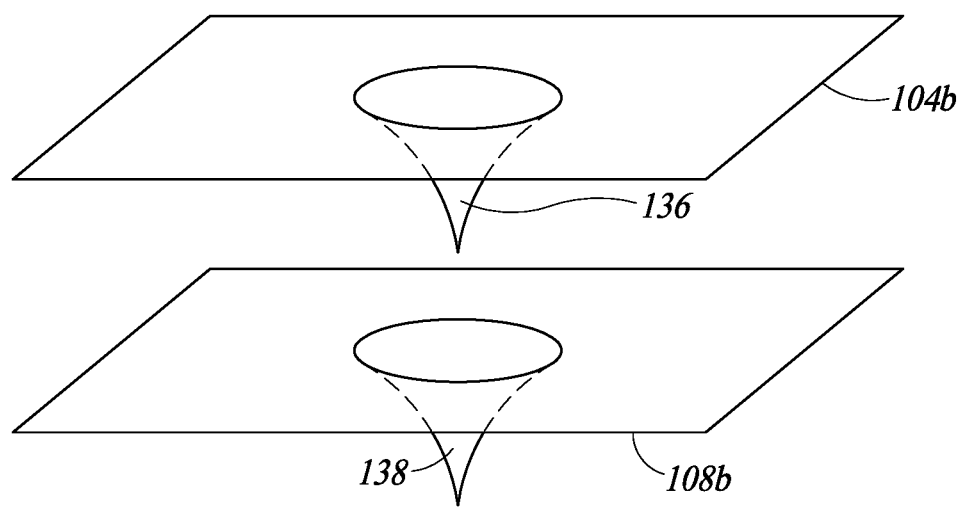
Figure 5C:
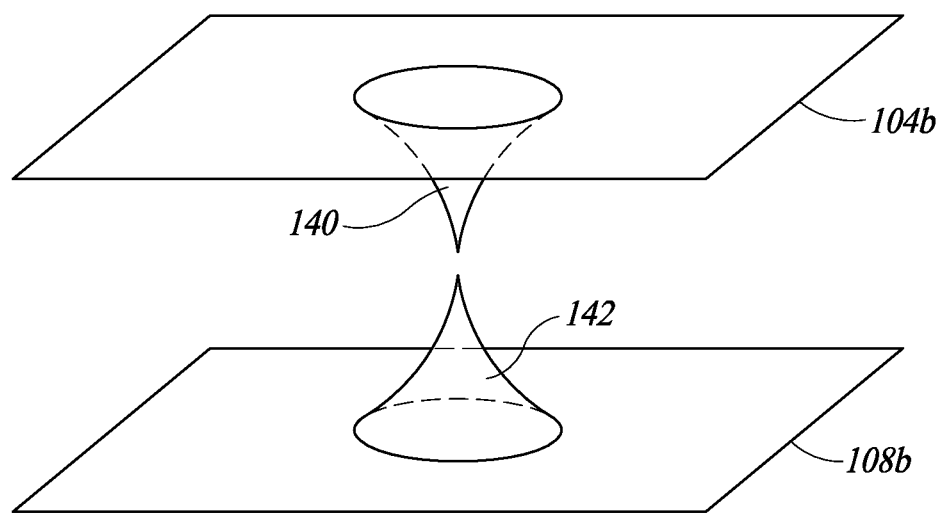
Figure 5D:
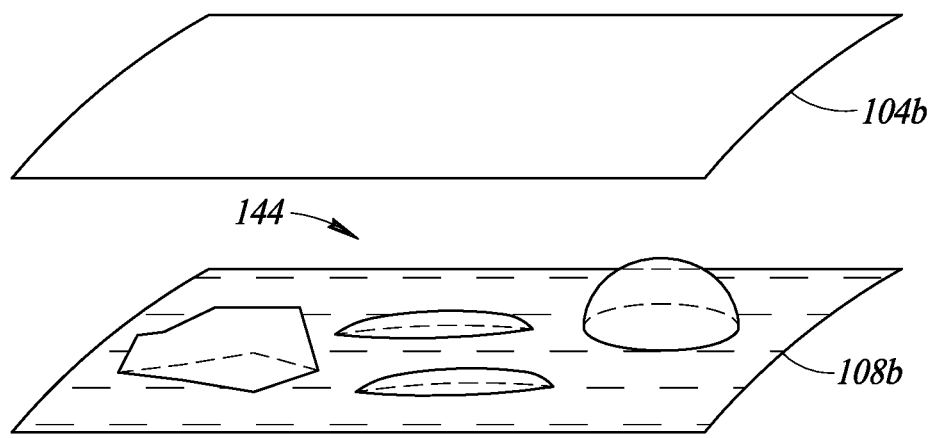

With reference to FIG. 5A, as the first capacitive plate 104*b* is pushed toward the second capacitive plate 108*b* and the gap between the plates 104*b*, 108*b* narrows, the surface areas of the cone 132 and the inverted cone 134 that are exposed to each other continues to increase. As the plates 104*b*, 108*b* get closer to each other, the capacitance of the plates 104*b*, 108*b* resulting from the cone 132 nearing the inverted cone 134 increases. That is, the contribution of the cone 132 and the inverted cone 134 to the overall capacitance between the plates 104*b*, 108*b* increases as the distance between the plates 104*b*, 108*b* narrows.

In the saturation region, the capacitive plates 104*b*, 108*b* have already been brought close to each other and further narrowing of the gap as a result of the application of increased pressure is reduced, thereby inhibiting further capacitive response. The cone 132 and the inverted cone 134 expose greater surface areas of the capacitive plates 104*b*, 108*b* to each other. Thus, the changes in the capacitive response are amplified in the saturation region and the capacitive response of the pressure sensor is extended and improved.

It is noted that contouring the capacitive plates 104*b*, 108*b* may be performed such that the impact of the contouring on the capacitance is greater as the distance between the capacitive plates 104*b*, 108*b* narrows. As such, the contouring compensates for the reduced capacitive response that otherwise occurs in the saturation region, where the diaphragm's resistance to pressure-induced flexing is greater.

In various embodiments, the first and second capacitive plates 104*a*, 108*a* of the capacitive pressure sensor 100*a* described with reference to FIGS. 1 and 3 may be contoured or may have microstructures thereon as described with reference to FIGS. 5A-5D.

It is noted that the capacitive plates 104*b*, 108*b* (and in general, the capacitors described herein with improved capacitive response) are not exclusive to capacitive pressure sensors. Such contoured capacitive plates may be used in any capacitor, such as a capacitor for a capacitive touch sensors or a capacitor for a switching device, among others.

In an embodiment, a pressure sensing device may include a plurality of capacitive pressure sensors. The plurality of capacitive pressure sensors may have a plurality of capacitive responses, respectively, and a plurality of dynamic ranges, respectively. The plurality of capacitive responses are different from each other. Further, the plurality of dynamic ranges are also different from each other. The plurality of capacitive responses, when adjoined, result in a widened overall capacitive response of the pressure sensing device. The overall capacitive response may span a wider range of pressures than any single capacitive response of a respective capacitive pressure sensor alone. Similarly, the dynamic ranges of the plurality of capacitive pressure sensors, when adjoined, result in a wider overall dynamic range of the pressure sensing device as compared to any single dynamic range of a respective capacitive pressure sensor alone.

The pressure sensing device may use the output of any one of the plurality of capacitive pressure sensors, or a combination thereof, for outputting a sensed pressure measurement. The pressure sensing device may determine which of the plurality of capacitive pressure sensors to use based on one or more of the sensed pressure measurements output from each of the pressure sensors.

Figure 6:
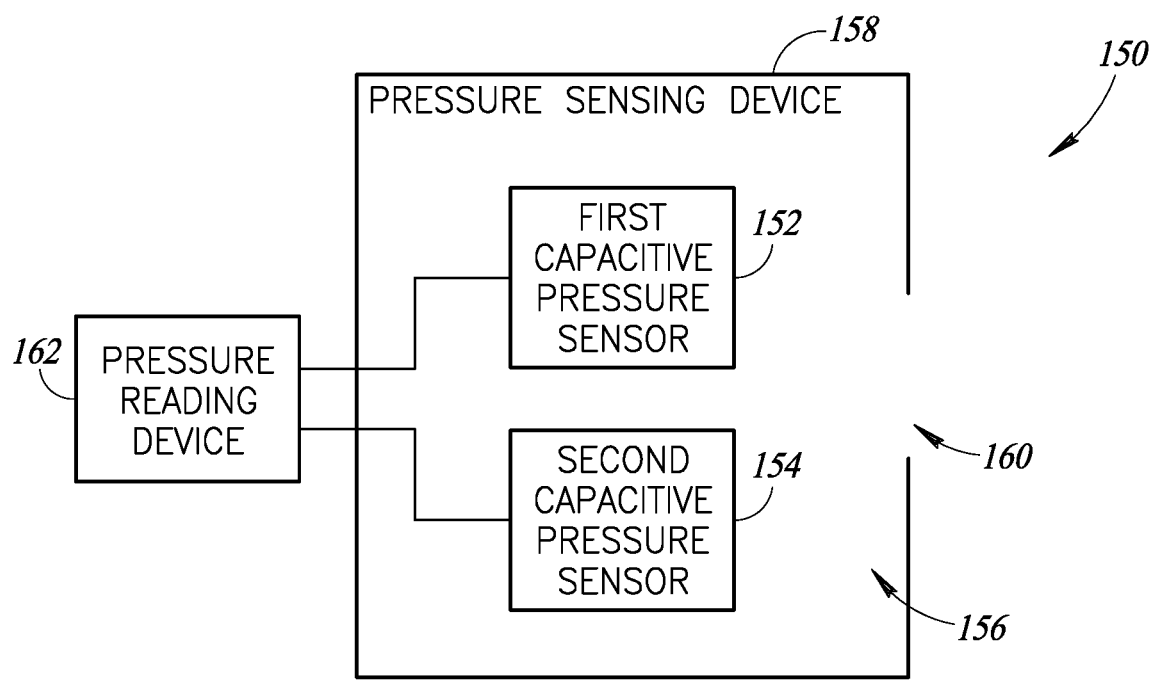
FIG. 6 shows a pressure sensing device in accordance with at least one embodiment.

FIG. 6 shows a pressure sensing device 150 constructed in accordance with at least one embodiment of the present disclosure. The pressure sensing device 150 includes a first capacitive pressure sensor 152 and a second capacitive pressure sensor 154, though in other embodiments the pressure sensing device 150 may include three or more capacitive pressure sensors. As illustrated in FIG. 6, the first and second capacitive pressure sensors 152, 154 are both exposed to a pressure responsive media 156, which may be air, liquid, or a vacuum, among others. The pressure sensing device 150 shown in FIG. 6 includes a housing 158 in which the first and second capacitive pressure sensors 152, 154 are disposed. The housing 158 has an inlet 160 through which a pressure of an outside environment is conveyed to the pressure responsive media 156 for measurement. The inlet 160 is a common access point for pressure outside the housing 158 to be sensed by both sensors 152, 154. It is noted that in alternative embodiments the housing 158 and the inlet 160 may be dispensed with or a different housing 158 or inlet 160 configuration may be used.

The pressure sensing device 150 includes a pressure reading device 162 that is operatively coupled to the first and second capacitive pressure sensors 152, 154. The pressure reading device 162 may be, for example, a pressure gauge or a controller. The pressure reading device 162 may receive signals indicating the pressure measurements made by the first and second capacitive pressure sensors 152, 154. For example, the pressure reading device 162 may receive data (or a signal) representative of the pressure measurements made by the capacitive pressure sensors 152, 154.

To output a sensed pressure, e.g., of the outside environment, the pressure sensing device 150 (or pressure reading device 162 thereof) determines which of the capacitive pressure sensors 152, 154 to use based on a pressure measurement made by at least one of the sensors 152, 154. The pressure sensing device 150 may also determine which sensor to use based on the known capacitive responses of the respective capacitive pressure sensors 152, 154. In yet other embodiments, the pressure sensing device 150 (or pressure reading device 162 thereof) may output a sensed pressure that is based on a combination of pressure measurements made by more than one pressure sensor 152, 154.

Figure 7:
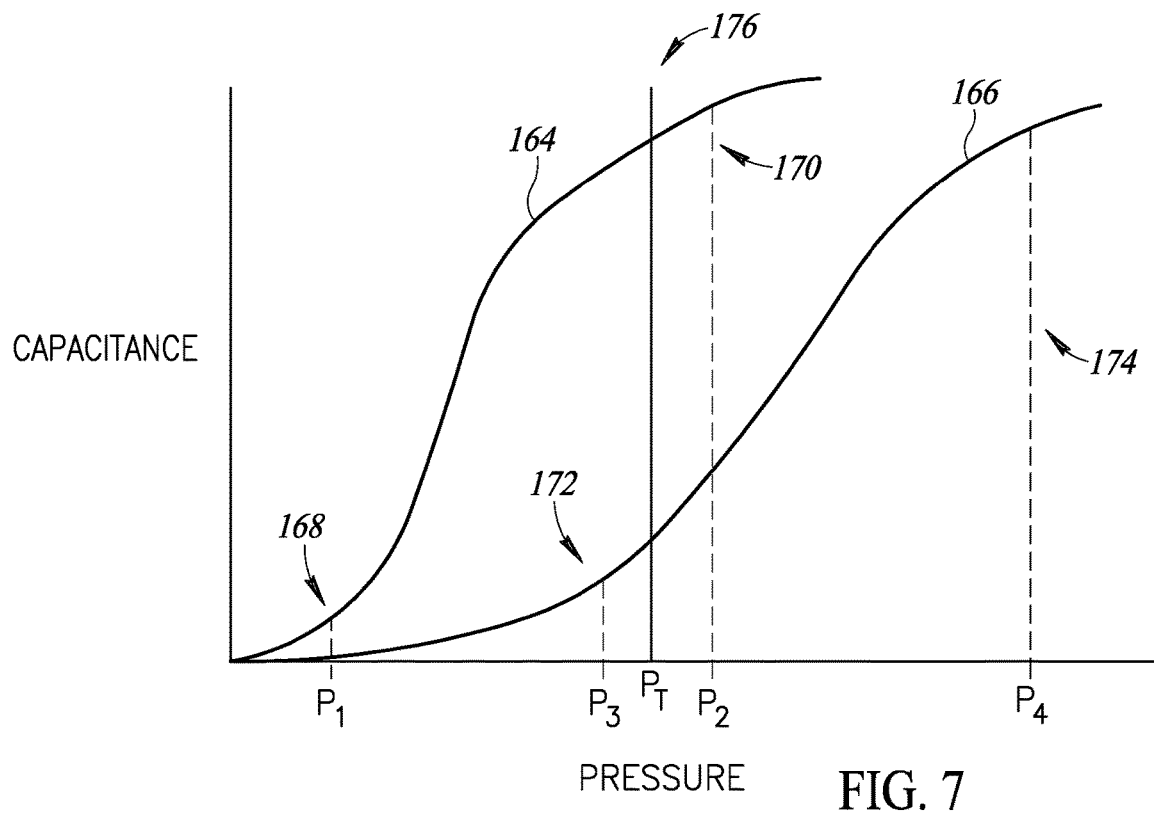
FIG. 7 shows first and second capacitive responses of the first and second capacitive pressure sensors, respectively, of the pressure sensing device described with reference to FIG. 6.

FIG. 7 shows an example of first and second capacitive responses 164, 166 of the first and second capacitive pressure sensors 152, 154, respectively, of the pressure sensing device described with reference to FIG. 6. The first capacitive response 164 has a dynamic range between a first pressure point 168 (denoted as 'P$_1$') and a second pressure point 170 (denoted as 'P$_2$'). The second capacitive response 166 has a dynamic range between a third pressure point 172 (denoted as 'P$_3$') and a fourth pressure point 174 (denoted as 'P$_4$').

For environmental pressures less than the third pressure point 172, the first capacitive pressure sensor 152 yields a more accurate pressure measurement than the second capacitive pressure sensor 154. For pressure measurements greater than the second pressure point 170, the second capacitive pressure sensor 154 yields a more accurate pressure measurement than the first capacitive sensor 152. Thus, to improve the pressure measurement capability of the pressure sensing device 150, the pressure sensing device 150 may selectively output the pressure measurement made by the first capacitive pressure sensor 152 when the pressure measurement is less than the third pressure point 172, and the pressure sensing device 150 may selectively output the pressure measurement made by the second capacitive pressure sensor 154 when the pressure measurement is greater than the second pressure point 170.

The pressure sensing device 150 may be configured with a threshold 176 (denoted as 'P$_T$'). Based on the pressure measurements made by the first capacitive pressure sensor 152, the second capacitive pressure sensor 154 or both, the pressure sensing device 150 may determine whether the pressure measurement is above or below the threshold 176. If the pressure measurement is below the threshold 176 the output of the first capacitive pressure sensor 152 may be used. Conversely, if the pressure measurement is above the threshold 176 the output of the second capacitive pressure sensor 154 may be used. In some embodiments, the pressure P$_T$ at the threshold 176 may be an average or midpoint between the pressure P$_3$ at the third pressure point 172 and the pressure P$_2$ at the second pressure point 170, though in other embodiments, the threshold 176 may be set at any pressure point at or between the second and third pressure points 170 and 172.

It is noted that the pressure measurements of the first and second capacitive pressure sensors 152, 154 may be different. Accordingly, the pressure sensing device 150 may use either measurement or a function of either or both measurements for comparison with the threshold 174. For example, the pressure sensing device 150 may use the higher or lower pressure measurement or an average, mean or median of the pressure measurements for comparison with the threshold 174. The pressure sensing device 150 may also select which pressure measurement to use based on specified ranges of pressure measurements and the identity of the sensor 152, 154 making the measurement.

The pressure sensing device 150 may include any number of capacitive pressure sensors. Each capacitive pressure sensor may be responsive (or may have a dynamic range) over a different pressure range. Depending on the pressure of the environment, the pressure sensing device 150 may use any one (or combination) of the different capacitive pressure sensors to measure the pressure. The range of pressure over which the pressure sensing device 150 is operative or reliable is thereby increased as compared to a pressure sensing device having only one capacitive pressure sensor.

Figure 8:
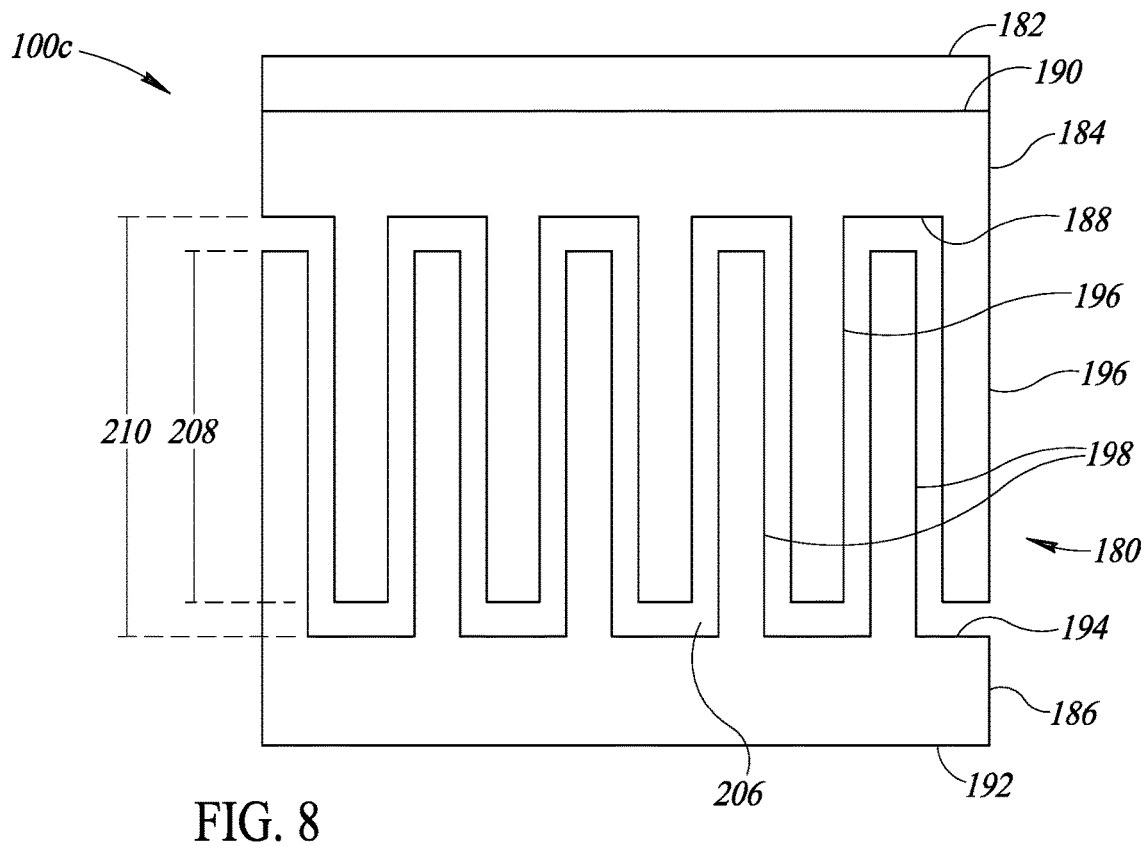
FIG. 8 shows a capacitive pressure sensor in accordance with at least one embodiment.

FIG. 8 shows another capacitive pressure sensor 100c in accordance with at least one embodiment of the present disclosure. The capacitive pressure sensor 100c includes an interdigital capacitor 180 and a diaphragm 182. The interdigital capacitor 180 includes a first conductor 184 and a second conductor 186. The first conductor 184 has a first side 188 and a second side 190, and the second conductor 186 has a first side 192 and a second side 194. The first side 188 of the first conductor 184 has a plurality of first fingers 196 thereon. The second side 194 of the second conductor 186 has a plurality of second fingers 198 thereon.

The plurality of first fingers 196 and the plurality of second fingers 198 are interleaved. The plurality of first fingers 196 and the plurality of second fingers 198 have a dielectric 206 therebetween. The diaphragm 182 is adjacent to the second side 190 of the first conductor 184.

The capacitance of the interdigital capacitor 180 increases as an overlap distance 208 between the pluralities of first and second fingers 196, 198 increases. The overlap distance 208 may be a distance between a tip of a first finger of the plurality of first fingers 196 and a tip of a second finger of the plurality of second fingers 198, whereby the overlap distance 208 is over a longitudinal axis of the first finger or the second finger. By another measure, the capacitance of the interdigital capacitor 180 also increases as a conductor distance 210 between the first side 188 of the first conductor 184 and the second side 1924 of the second conductor 186 decreases.

The diaphragm 182, which may be similar to the diaphragm 102 described with reference to FIG. 3 herein, is movably responsive to pressure such that an increase in the pressure causes the diaphragm to flex towards the first conductor 184. Conversely, when the diaphragm 182 is flexed, a decrease in pressure causes the diaphragm 182 to relax and straighten or move away from the first conductor 184.

When the diaphragm 182 flexes in response to pressure, the overlap distance 208 is lengthened and the conductor distance 210 is shortened resulting in a measurable increase in capacitance. Similarly, when the diaphragm 182 relaxes in response to the removal of pressure, the overlap distance 208 is shortened and the conductor distance 210 is lengthened resulting in a measurable decrease in capacitance.

In an embodiment, the capacitive plates 104, 108 or the conductors 184, 186 may be metallized to modify their capacitive responses. Metallizing a plate or a conductor aids in distributing charge the over a surface of the plate or conductor. Metallizing a plate or a conductor may be performed by adding or placing a material, such as, hafnium (Hf) or hafnium oxide, on the plate or conductor. A tantalum (Ta) plate or conductor may be metallized by adding tantalum oxide coating on the tantalum plate or conductor. Oxidizing a metal plate puts a dielectric coating on the metal, which protects the metal from changing. Oxidizing the metal plate increases the capacitance of the capacitance assembly for a given separation distance between plates. Metallizing magnifies the capacitance between the plates of conductors and results in improving pressure measurement.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A capacitive pressure sensor, comprising:
   an interdigital capacitor including:
      a first conductor having a first side and a second side, the first conductor having a first plurality of fingers extending longitudinally from the first side of the first conductor; and
      a second conductor having a first side and a second side, the second conductor having a second plurality of fingers extending longitudinally from the second side of the second conductor, the second plurality of fingers being interleaved with the first plurality of fingers with a dielectric therebetween; and
   a diaphragm adjacent to the second side of the first conductor, the diaphragm being movably responsive to an environmental pressure proximate to the diaphragm such that an increase in the environmental pressure causes the diaphragm to flex onto the first conductor, causing a distance between the first and second conductors to shorten and thereby increase a capacitance between the first and second conductors, the diaphragm having a hollowed volume within an interior of the diaphragm operative to increase a flexibility of the diaphragm in response to the environmental pressure, and the hollowed volume including globules of vacuum or air dispersed within the interior of the diaphragm.

2. The capacitive pressure sensor of claim 1, wherein at least one of the first plurality of fingers and at least one of the second plurality of fingers are metalized with hafnium or hafnium oxide.

3. The capacitive pressure sensor of claim 1, wherein at least one of the first plurality of fingers and at least one of the second plurality of fingers include tantalum and are metalized with a tantalum oxide coating thereon.

4. The capacitive pressure sensor of claim 1, wherein at least one of the first plurality of fingers and at least one of the second plurality of fingers are metalized to amplify the capacitance between the first and second pluralities of fingers.

5. The capacitive pressure sensor of claim 1, wherein at least one of the first plurality of fingers and the second plurality of fingers are contoured to increase a surface area of the at least one of the first plurality of fingers and the second plurality of fingers that is exposed to the other of the first plurality of fingers and the second plurality of fingers.

6. The capacitive pressure sensor of claim 1, wherein the hollowed volume extends longitudinally at least partially through the diaphragm.

7. A pressure sensing device, comprising:
   a first capacitive pressure sensor according to claim 1 that is exposed to the environmental pressure, the first capacitive pressure sensor having a first capacitive response, the first capacitive response having a first dynamic range over a first pressure range, the first capacitive pressure sensor being configured to:
      sense a first pressure being exerted upon the first capacitive pressure sensor; and
      output, based on the sensed first pressure, a first signal representative of a first pressure measurement of the first capacitive pressure sensor;
   a second capacitive pressure sensor according to claim 1 that is exposed to the environmental pressure, the second capacitive pressure sensor having a second capacitive response different than the first capacitive response, the second capacitive response having a second dynamic range over a second pressure range that is different than the first pressure range, the second capacitive pressure sensor being configured to:
      sense a second pressure being exerted upon the second capacitive pressure sensor; and
      output, based on the sensed second pressure, a second signal representative of a second pressure measurement of the second capacitive pressure sensor; and
   control circuitry configured to:
      receive the first and second signals from the first and second capacitive pressure sensors;

determine, based on the first and second signals and the first and second pressure ranges, whether to output the first or second pressure measurement as a measurement of the environmental pressure; and in response to the determination, output the measurement of the environmental pressure.

8. The pressure sensing device of claim 7, wherein determining whether to output the first or second pressure measurement includes:

identifying the first and second pressure measurements based on the first and second signals, respectively;

identifying one of the first pressure range and the second pressure range that includes at least one of the first pressure measurement, the second pressure measurement, or a pressure value that is a function of the first and second pressure measurements; and outputting the first pressure measurement as the measurement of the environmental pressure if the first pressure range includes the at least one of the first pressure measurement, the second pressure measurement, or the pressure value, or outputting the second pressure measurement if the second pressure range includes the at least one of the first pressure measurement, the second pressure measurement, or the pressure value.

9. The pressure sensing device of claim 7, wherein determining whether to output the first or second pressure measurement includes:

selecting one of the first pressure measurement, the second pressure measurement, or a pressure value that is a function of the first and second pressure measurements;

if the selected one of the first pressure measurement, the second pressure measurement, or the pressure value is less than a threshold pressure, outputting the first pressure measurement; and if the selected one of the first pressure measurement, the second pressure measurement, or the pressure value is greater than the threshold pressure, outputting the second pressure measurement.

* * * * *